C. A. L. W. WITTER.
PROCESS OF SEPARATING ZINC AND LEAD FROM MIXED SULFIDS.
APPLICATION FILED NOV. 8, 1909.

1,047,360.

Patented Dec. 17, 1912.

Witnesses
R W Dommers
May Ellis

Inventor
Carl August Louis Wilhelm Witter
By Henry Orth
Atty.

UNITED STATES PATENT OFFICE.

CARL AUGUST LOUIS WILHELM WITTER, OF HAMBURG, GERMANY.

PROCESS OF SEPARATING ZINC AND LEAD FROM MIXED SULFIDS.

1,047,360.   Specification of Letters Patent.   Patented Dec. 17, 1912.

Application filed November 8, 1909. Serial No. 526,827.

*To all whom it may concern:*

Be it known that I, CARL AUGUST LOUIS WILHELM WITTER, a citizen and resident of Hamburg, Germany, have invented a certain new and useful Process of Separating Zinc and Lead from Mixed Sulfids, of which the following is a specification.

The present invention relates to an improved process of separating zinc and lead from mixed sulfids.

The problem of the rational treatment of ores containing a mixture of lead and zinc—the so-called complex sulfids—has not yet been solved, notwithstanding the extraordinary amount of money and labor sacrificed since the celebrated Broken Hill mines in Australia were discovered. In many cases where such complex ores occur it has been possible to utilize them by applying new working processes, but in other cases every known process has proved unsuitable. A considerable number of endeavors to solve this problem are recorded in patent literature but very few of these have gone beyond the experimental stage, and of these few only one here and there has been put into practice with more or less success.

The process hereinafter described can be used for the treatment of any mixed zinc-lead ore that occurs in nature, and it can be applied in uncivilized lands provided only that coal or wood, or water power, is available.

The new process aims at the complete separation of the zinc from the lead and from the precious metals contained in ore at one operation. It is based upon the well known fact that lead and zinc can be almost completely separated if their oxids be mixed with the quantity of coal required to reduce them, and the mixture exposed, in a suitable neutral or reducing atmosphere.

The new process is carried out by means of a reverberatory furnace which I have illustrated, by way of example, in the accompanying sheet of drawings in which—

Figure 1:
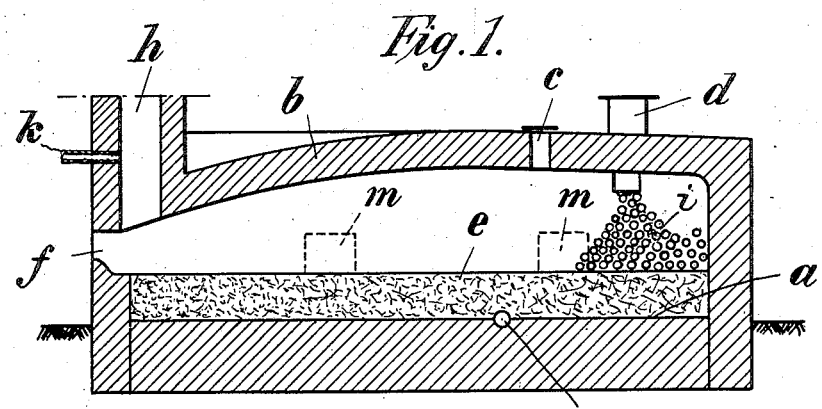
Figure 2:
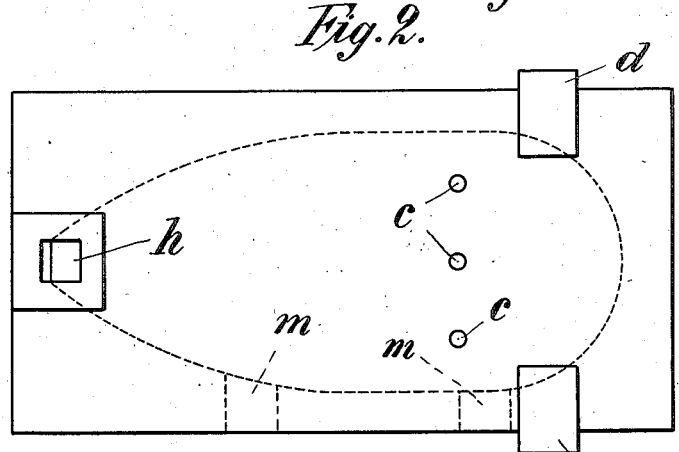
Figure 3:
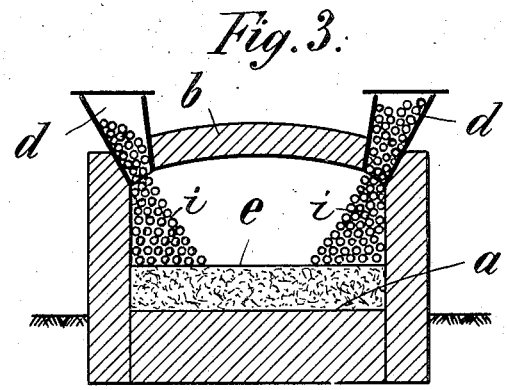

Figure 1 is a longitudinal sectional elevation and Fig. 2 a plan of the reverberatory furnace; Fig. 3 is a cross section of the said furnace.

Similar letters of reference refer to like parts throughout the figures.

$a$ is the hearth, $b$ the arch, $c$ are the gas ports, $d$ the charging shafts, $e$ is the layer of slag, $f$ the slag outlet, $g$ the tap for drawing off the lead, $h$ the flue or uptake for the zinc oxid and the combustion gases; the flue is provided with suitable means as a pipe $K$ to admit fresh or atmospheric air into the flue, $i$ is the material charged and $m$ are working doors.

The new process is carried out as follows: The sulfid ores are ground so as to reduce them to a degree of fineness that will permit of proper roasting or calcination. They are then roasted till they contain only traces of sulfur and are mixed with the necessary quantity of reducing material, for example coal, and with some binding material such as lime, and formed into briquets. These briquets are fed through the charging or filling shafts $d$ into the reverberatory furnace that is heated through the gas ports $c$ with producer gas, or some other gas, or electrically. In order to maintain a non-oxidizing, that is to say, a neutral, or preferably, a reducing atmosphere, at the part where the furnace is charged, the gas and air must be introduced as it is the case with the gas ports $c$, at or near the arch of the furnace and inasmuch as the flame is drawn toward the flue by the draft the whole process so conducted that the products of combustion do not come into contact with the material charged, nor pass through the material that is being put in. A layer of fluid slag $e$ is constantly kept in the furnace. This slag may if required be replaced by matte or metal and it serves as an underlay for the new material $i$ introduced into the furnace, which floats upon it. The underlay is permeable by the reduced lead or the matte that is formed. The layer of slag or matte in the furnace must be so thick as to prevent any large variation of temperature when a new charge is introduced. The introduction of the charge is effected through the said filling shafts $d$ at the sides of the top of the arch, in such a manner that the charging of the furnace takes place at a point back of or at the rear end of the current of gases and air passing to the flue *i. e.*, at the head of the furnace. The shafts are constantly kept filled with fresh briquets and flux and kept closed.

The furnace works continuously. As the briquets disappear, fresh ones, along with the necessary flux, fall from the filling shafts, in which they have been pre-heated. The reduced zinc is volatilized and in the flue or uptake it meets the combustion gases and atmospheric air admitted into the flue whereby its is re-oxidized, and issues from the furnace as an oxid, practically free from lead. When the gases are cooled, the oxid is recovered by condensation. The residue left in the furnace is skeletonlike and contains the reduced lead in the form of small globules. On coming in contact with the fluid slag, the gangue of the ore is taken up by it, and the metallic lead sinks to the bottom. Any excess of coal passes gradually, along with the slag, toward the slag outlet $f$, below the uptake or flue $h$, and as it moves it spreads itself over the slag and is burned. The slag is drawn off periodically.

The results gotten by the application of the process above described are attained because the charge put into the furnace does not come into contact with the gases containing air and escaping to the flue; further because a certain definite temperature is regularly maintained in the furnace and the uniformity of that temperature is regulated by the presence of certain definite mass of fluid slag; and because, after all the zinc has been distilled off, the reduced lead, along with any precious metals present, collects as regulus under the slag.

The carrying out of the improved process into practice is not restricted to the use of coal as a reducing means, an addition for example, of metallic iron may also serve the purpose. This metallic iron addition reacts on the zinc oxid or other zinc combinations setting free at the same time metallic zinc. The latter escapes with and is re-oxidized by the combustion gases and admitted atmospheric air into zinc oxid, as already stated above.

Instead of iron alone a mixture of iron and coal or iron ore and coal may be used as a reducing means. Instead of working materials in a solid state materials in a fluid state such as previously molten ores, fluid slags of lead- and copper-furnaces, and the like may be used. A corresponding quantity of such fluid material is mixed with iron or spongy iron obtained by reducing iron ore or the like and the mixture subjected to a further heating in the reverberatory furnace, the sole or bottom of which is constituted by a layer of slag of a sufficient thickness or depth in order to prevent any greater variations of temperature when introducing new charges.

This process is distinguished from the already known purely metallurgical processes by the fact that in the latter there are always mixed with the zinc oxid considerable quantities of lead, if not all the lead, in the form of lead oxid.

I claim:

1. The process of separating zinc and lead from mixed sulfid ores in a suitable furnace, which comprises simultaneously reducing the oxidized ores and separating the metals in a non-oxidizing atmosphere substantially out of contact with the flame at a suitable reducing temperature while maintaining a layer of slag sufficiently thick to insure regulation and uniformity of temperature and under which substantially all of the lead collects.

2. The process of separating zinc and lead from mixed ores of zinc and lead, which comprises charging the oxidized ore into a suitable furnace with a reducing agent, and simultaneously effecting the reduction and separation of the metals in a non-oxidizing atmosphere at a suitable reducing temperature and substantially out of contact with the flame of the furnace while maintaining a layer of slag sufficiently thick to insure regulation and uniformity of temperature.

3. The process of separating zinc and lead from mixed ores of zinc and lead, which comprises charging the ore with carbonaceous material and a material containing iron into a suitable furnace, and simultaneously effecting the separation of the metals in a non-oxidizing atmosphere at a suitable reducing temperature while substantially out of contact with the flame of the furnace while maintaining a layer of slag sufficiently thick to insure regulation and uniformity of temperature.

4. The process of separating zinc and lead from mixed sulfid ores of zinc and lead, which comprises oxidizing the ores, charging them with a reducing agent into a suitable furnace substantially out of contact with the flame thereof on a layer of fluid slag sufficiently thick to insure regulation and uniformity of temperature in the presence of a non-oxidizing atmosphere, thereby volatilizing the zinc and melting down and slagging the residue and recovering the zinc from the furnace gases.

5. The process of separating zinc and lead from mixed sulfid ores of zinc and lead, which comprises comminuting the ores, subjecting them to oxidizing roasting to eliminate the greater part of their sulfid content, briqueting the ore with a reducing agent and a binder, charging the briquets so formed into a suitable furnace in the presence of a non-oxidizing atmosphere and substantially out of contact with the flame of the furnace and on a fluid slag under-lay sufficiently thick to maintain a substantially uniform temperature within the furnace thereby reducing and evaporating the zinc, oxidizing and cooling the zinc vapors, and recovering the zinc as oxid of zinc.

6. The process of separating zinc and lead from mixed oxidized sulfid ores in a suitable furnace, which comprises simultaneously reducing and separating the metals in a reducing atmosphere substantially out of contact with the flame at a suitable reducing temperature while maintaining a layer of slag sufficiently thick to insure a regulation and uniformity of temperature.

7. The process of separating zinc and lead from mixed sulfid ores of zinc and lead, which comprises charging the oxidized ores with iron as a reducing agent behind the flow of gases in the furnace in the presence of a substantially quiescent reducing atmosphere onto a thick slag underlay, recovering the zinc from the gases and tapping off the lead.

CARL AUGUST LOUIS WILHELM WITTER.

Witnesses:
MAX KAEMPFF.
ERNEST H. L. MUMMENHOFF.